United States Patent [19]

Chapnerkar et al.

[11] Patent Number: 5,332,564
[45] Date of Patent: Jul. 26, 1994

[54] PROCESS FOR PRODUCTION OF RHOMBIC SHAPED PRECIPITATED CALCIUM CARBONATE

[75] Inventors: Vasant D. Chapnerkar, Tampa, Fla.; Mohan N. Badgujar, Milledgeville, Ga.

[73] Assignee: ECC International Inc., Atlanta, Ga.

[21] Appl. No.: 911,417

[22] Filed: Jul. 10, 1992

[51] Int. Cl.$^5$ .............................. C01F 5/24; C01F 11/18
[52] U.S. Cl. ........................................ 423/432; 423/164; 423/165; 106/464; 106/465
[58] Field of Search ................ 423/164, 165, 430, 432, 423/640; 106/464, 465

[56] References Cited

U.S. PATENT DOCUMENTS

| | | | |
|---|---|---|---|
| 2,143,774 | 1/1939 | Hart | 423/165 |
| 2,188,663 | 1/1940 | McClure et al. | 423/432 |
| 2,467,082 | 4/1949 | Fleck | 423/430 |
| 3,320,026 | 5/1967 | Waldeck | 423/432 |
| 3,443,890 | 5/1969 | Sisson et al. | 423/432 |
| 3,669,620 | 6/1972 | Bennett et al. | 423/432 |
| 4,018,877 | 4/1977 | Woode | 423/165 |
| 4,237,147 | 12/1980 | Merten et al. | 423/432 |
| 4,824,654 | 4/1989 | Ota et al. | 423/432 |

FOREIGN PATENT DOCUMENTS

| | | | |
|---|---|---|---|
| 1-301510 | 12/1989 | Japan | 423/432 |
| 2-59422 | 2/1990 | Japan | 423/640 |
| 3-126616 | 5/1991 | Japan | 423/432 |

*Primary Examiner*—Gary P. Straub
*Attorney, Agent, or Firm*—Klauber & Jackson

[57] ABSTRACT

A process for producing rhombic or barrel shaped precipitated calcium carbonate. Quicklime is slaked in an aqueous solution containing about 0.1% to about 2% by weight of a sugar, based upon the weight of the CaCO$_3$ to be produced. Carbon dioxide is added to the slaked lime slurry at a preferred temperature of about 50° F.–70° F. until the pH drops from about 11–12 to about 7–8.

14 Claims, 5 Drawing Sheets

PROCESS FOR PRODUCTION OF RHOMBIC SHAPED PRECIPITATED CALCIUM CARBONATE

BACKGROUND OF THE INVENTION

The invention described herein relates to an improved method for the consistent production of rhombic and barrel shaped precipitated calcium carbonate (PCC). The process allows enhanced control of the surface area of PCC, higher starting carbonation temperatures, more tolerance to the fluctuations in the starting carbonation temperatures, high solids concentration, higher starting temperature for slaking, and obviates the need to control the temperature during slaking and carbonation.

Calcium carbonate pigments have found increasing application as fillers, and also as coating pigments, in the manufacture of paper and paperboard. This utility arises by virtue of their excellent optical and physical properties when used for such purposes.

The consistent production of rhombic and barrel shaped PCC from various limes has not been achieved previously. The production of rhombic and barrel shaped PCC utilizing temperature control alone has seemed to provide a "hit or miss" approach in the lab as well as in commercial operations. Inconsistent results are typical with a tendency to produce very high surface area PCC—for example having BET surface areas greater than 20 m$^2$/g). Because of this tendency to produce very high surface area PCC, the control of starting carbonation temperatures has become critical, since small temperature variations can produce large surface area fluctuations.

To avoid these prior inconsistencies, alternatives such as lower starting slaking and carbonation temperatures and lower solids concentration have been attempted with mixed results. It also has been disclosed in the art to reduce the sensitivity of the PCC production processes by the use of certain additives. For example, U.S. Pat. No. 2,188,663 (McClure et al,) relates to a process of making fine particle alkaline earth metal carbonates by reacting an aqueous suspension of Ca(OH)$_2$ with carbon dioxide to form substantially colloidal CaCO$_3$. By addition of certain agents to the Ca(OH)$_2$ suspension, including certain saccharides, the temperature range at which the reaction can be conducted is said to be widened to avoid the need for rigid temperature control.

Additional prior art patents of pertinence to this invention include the following:

U.S. Pat. No. 2,467,082 (Fleck) relates to the manufacture of CaCO$_3$, and the use of a sugar-free extract from sugar beet residue for inhibiting the growth of CaCO$_3$ crystals precipitated from a Ca(OH)$_2$ slurry by carbonation.

U.S. Pat. No. 3,320,026 (Waldeck) teaches the production of rhombic PCC by employing lower hydroxide concentrations, lower slaking temperature, and controlling the maximum slaking and carbonation temperatures to a lower limit.

U.S. Pat. No. 3,433,890 (Sisson et al.) relates to the production of precipitated CaCO$_3$ of purportedly uniform and fine ultimate particle size. Particles less than about 0.1 micron are precipitated from an aqueous suspension of Ca(OH)$_2$ in the presence of about 0.2 to 5% by weight of a saccharide or polyol and about 0.2 to 5% of an active CO$_2$ compound.

U.S. Pat. No. 3,669,620 (Bennett et al.) relates to needle-shaped (aragonite) crystals of CaCO$_3$ made by dissolving calcium hydroxide in an aqueous sucrose solution, and then treating the solution with carbon dioxide. The aragonite needle-shaped crystals can be produced in lengths up to about 50 microns.

None of the above patents addresses the consistent production of PCC having rhombic or barrel shaped crystals and a BET surface area less than about 20 m$^2$/g.

The terms "rhombic" and "barrel-shaped" are used qualitatively when appropriate herein to refer to the overall shape of the PCC particles. The term "rhombic" indicates an aspect ratio of 1.5 or less, whereas "barrel" indicates an aspect ratio higher than 1.5.

The term "aspect ratio" as used herein is defined as the ratio of the length of the longest side of the crystal to the diameter of the shortest side of the crystal. The aspect ratio can be a number, e.g. 1 when all the crystals are uniform with an L/D ratio of 1, or it can be a range, for example 1 to 1.5 when a mixture of crystals is present having as aspect ratio values from 1 to 1.5.

The present invention eliminates the aforementioned problems to provide rhombic or barrel-shaped PCC of extremely uniform particle size and surface area; it allows use of higher solids concentration, higher slaking temperatures, and eliminates the need to control maximum slaking and carbonation temperatures.

OBJECTS OF THE INVENTION

The invention described herein substantially avoids the inconsistent very high surface area products made by the prior known processes. Consequently, and although not so limited, one object of the present invention is to provide a process for consistently producing rhombic or barrel-shaped PCC with a BET surface area of less than 20 m$^2$/g.

Another object of the present invention is to provide a process for the production of PCC wherein the effect of the starting carbonation temperature on PCC surface area is relatively small, and more uniform.

A further object of the invention is to provide a PCC production process of the foregoing character, which may use relatively high slaking temperatures, resulting in lower residue and higher yields.

A still further object of the invention is to provide a process of the foregoing type, which allows higher solids concentration.

A still further object of the invention is to provide a PCC production process of the foregoing character, which eliminates the need to control maximum slaking and carbonation temperatures.

These and other objects of the present invention will be apparent to those of ordinary skill in the art from the teachings herein.

SUMMARY OF THE INVENTION

Now in accordance with the present invention, the foregoing objects, and others as will become apparent in the course of the ensuing specification, are achieved in an improved process for the manufacture of rhombic or barrel-shaped precipitated calcium carbonate. In accordance with the invention, quicklime (CaO) is slaked to calcium hydroxide in the presence of a sugar such as sucrose, with the resulting Ca(OH)$_2$ then being carbonated to produce the PCC end product.

In a preferred procedure, quicklime is initially added to a warm aqueous solution (typically from 60° F. to 130° F.) containing at least 0.01% and preferably from about 0.01% to about 2% by weight of the sugar, based upon the weight of the PCC produced. The quicklime is continuously mixed until reacted with the sugar solution, forming a slaked lime slurry. Carbon dioxide is then added to the slaked lime slurry which is at an initial temperature of about 40° to 80° F. and preferably from about 50° to 70° F. with essentially continuous mixing until the pH drops from about 11-12 to about neutral (7-8), and the desired rhombic or barrel-shaped PCC is formed. The carbon dioxide can be added alone to the slaked slurry or added in admixture with an inert gas or air. Mixture of carbon dioxide and air in relative ratios of from about 1:0 (i.e. 100% $CO_2$) to 1:20, are typical.

BRIEF DESCRIPTION OF THE DRAWINGS

The invention is described in connection with the accompanying drawings, in which.

DETAILED DESCRIPTION

Although the procedure is described herein for quicklime converted to $Ca(OH)_2$ to $CaCO_3$, it can be applied to any source of $Ca^{++}$ and $CO_3^{2-}$ ions readily; as can be appreciated by those familiar with the art.

As used herein, the term "quicklime" is used in the conventional sense to refer to calcium oxide (CaO). The quicklime used in the present invention is most preferably freshly procured. The lime may be tested for usefulness herein by utilizing ASTM procedure C-110, which is incorporated herein by reference. The most preferred lime used herein has a reactivity as determined under ASTM C-110 which is not less than a 20° C. rise in temperature in 30 seconds.

The sugar which is used herein to make the reactive aqueous sugar solution can be any of numerous common mono- or disaccharides, the most preferred of which is sucrose due to its ready availability, solubility, reactivity in the process and inexpensive nature. Alternative preferred sugars include, e.g., glucose, fructose, lactose, dextrose or solutions containing mono or disaccharides.

The amount of sugar added to water to form the sugar solution is based upon the amount of PCC to be produced. For example, fresh quicklime (CaO) can be slowly added, under constant agitation, to a warm sugar solution containing at least 0.01 and preferably 0.01 to 2% sugar (based on the weight of the PCC to be produced). More preferably, 0.1 to 0.3% sugar is used. Sugar concentrations below about 0.01% may be only marginally effective. Additionally, very high dosages of sugar typically may carry unreacted sugar over into the carbonator, thus producing very fine particles of PCC.

The CaO is reacted with the sugar solution to form slaked lime, i.e. $Ca(OH)_2$. This is typically in the form of a slurry. The overall effect of this sugar addition to the slaking water appears to be production of slaked lime with a slightly higher surface area than that which is generated using other processes; in addition the effect of sugar on the solubility of $Ca(OH)_2$ is also believed to play a major role in this invention.

The selection of the optimum dosage of sugar also depends most importantly on the type of lime which is initially used. Very low dosages of sugar tend to be ineffective and may inconsistently produce very fine material (B.E.T. surface area greater than 20 $m^2/g$). On the other hand, higher dosages of sugar, e.g. 0.25% tend to consistently produce very fine rhombic PCC.

The intermediate sugar dosages (e.g. 0.05% to 0.25%) tend to consistently produce PCC crystals with surface areas in the typically desired range of 2 to 20 $m^2/g$.

While the use of too little sugar results in inconsistency—producing batches which may have desired surface area or may have very high surface area; too much sugar tends to consistently produce very high surface area PCC. Accordingly, if it is of interest to produce very high surface area PCC consistently (e.g. for plastics applications), higher sugar levels (above 2%) may be useful. However, such a result can be achieved by alternative methods, e.g. by keeping carbonation temperatures high. Use of the preferred dosage (0.01 to 2%) is unique in consistently producing rhombic PCC in the surface area range of 2 to 20 $m^2/g$ which is preferred for the paper manufacturing uses of primary interest to this invention.

Upon reaction of the quicklime with the aqueous sugar solution, slaked lime is produced, typically in the form of a slurry. This can be done with constant mixing. This mixing of the $Ca(OH)_2$ slurry may be continued for any appropriate additional time period, e.g., up to about 30 minutes. The suspension is then passed through a suitable screen to remove any grit and/or unreacted coarse material.

The slaking of CaO to form calcium hydroxide can also be accomplished through the use of a continuous slaker, such as a BIF slaker. In continuous slaking, the sugar solution of a predetermined concentration is usually prepared in advance, and is pumped to the slaker continuously. The flow rate and concentration of the sugar solution are determined based on the total PCC to be produced.

The $Ca(OH)_2$ slurry, produced through either the batch or continuous slaker operation, is transferred to a carbonator for the precipitation of calcium carbonate by the reaction between $Ca(OH)_2$ and $CO_2$. This is carried out using a carbonator. The carbonation can also be a batch or continuous operation.

The starting carbonation temperature can be critical for the production of the desired shape and surface area of the PCC. For rhombic PCC, a starting carbonation temperature of between 40° F. to 80° F. may be used, with between about 50° F. and 70° F. being preferred. The higher the temperature, the higher the surface area of PCC. More preferably, the initial temperature can be in the range of about 50° F. to 65° F. Higher (greater than 65° F.) temperatures tend to produce very high surface area PCC. The $CO_2$ source can be flue gas, kiln gas or $CO_2$ in a liquid carrier, containing 5 to 100%

$CO_2$ in the mixture. In a typical laboratory procedure, after the starting carbonation temperature is set at the appropriate desired level, carbonation is undertaken with a mixture of $CO_2$ and an inert gas, preferably air, usually at a ratio of about 1:3 to 1:4.

The carbonation reaction typically proceeds with constant stirring applied throughout the reaction period. The extent of the reaction toward completion can be evaluated based upon a lowering of the suspension pH from highly alkaline (11–12 pH) to near neutral (7–8 pH). Progress of the reaction can be monitored throughout the process by simply testing for this pH change.

After the hydroxyl species in solution is exhausted (i.e. all the slaked lime is converted to PCC), the carbonation can be continued for an additional period, e.g., another 10–20 minutes, to convert any unreacted calcium hydroxide that may have been coated by PCC. This is commonly known as the overcarbonation period.

The resulting PCC product is then typically passed through a suitable screen or filter to remove any gritty material and the surface area is determined by methods such as BET surface area analysis or Blaine air permeability analysis (which measures specific surface area).

DESCRIPTION OF PREFERRED EMBODIMENTS

The following examples illustrate the preferred embodiments of the processes for the production of rhombic or barrel-shaped PCC with various aspect ratios.

EXAMPLE 1

In order to produce rhombohedral PCC, 1400 grams of freshly procured lime (CaO) of a type G (source) with a reactivity preferably not less than a 20° C. rise in temperature in 30 seconds, was slowly added to 11.4 liters of sugar solution containing 0.15% sucrose by weight, based on the weight of the PCC. The sugar solution temperature was adjusted to 100° F. before starting the CaO addition. The flow rate of lime to the sugar solution was between 35 to 45 grams per minute. The slaker consisted of a cylindrical vessel fitted with four equidistantly placed baffle plates along the walls of the vessel. Slaking was carried out under constant agitation using a rotating agitator. The temperature of the slaked lime was not controlled during slaking and was allowed to rise. A temperature rise of about 30° to 40° F. was observed at this CaO addition rate. After all the CaO was added to the slaker, agitation was continued for an additional 30 minutes.

The slaked lime, $Ca(OH)_2$, was then passed through a 100 mesh screen to remove any grit and unreacted materials, and was then transferred to the carbonator. The carbonator had a construction similar to that of the slaker, except that the agitator consisted of two turbines. The temperature of the slaked lime was adjusted to 55° F. and the carbonation was started with constant agitation. The $CO_2$ and air flow rates were fixed to provide 25% $CO_2$ in the mixture.

The carbonation was continued for approximately three hours. During this period, the suspension was sampled and tested for residual hydroxide, $Ca(OH)_2$ to evaluate the progress of the reaction. When all the $Ca(OH)_2$ was exhausted, the carbonation was continued for an additional 20 minutes. The PCC batch was then passed through a 325 mesh screen to remove any grit and analyzed for particle shape and size. Specific surface area was determined (ASTM C-204-78a, hereby incorporated by reference) using a Blaine air permeability apparatus (manufacturer: Humboldt Mfg. Co. Chicago, Ill. 60656) and the particle shape was evaluated with a scanning electron microscope. The BET surface area was obtained by using nitrogen adsorption techniques.

Figure 1:
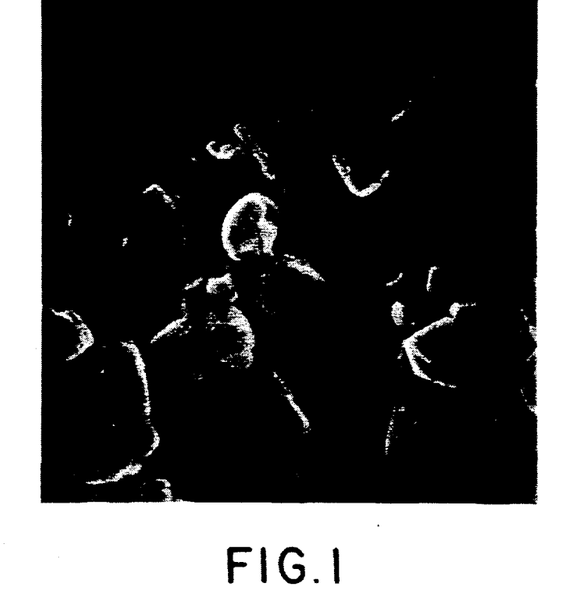
FIGS. 1 through 3 are electron photomicrographs of PCC produced with sugar in accordance with the invention.
Figure 2:
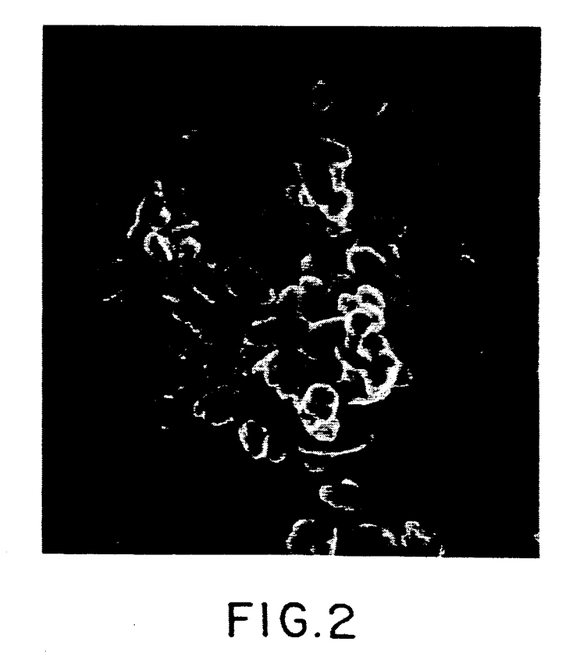
Figure 3:
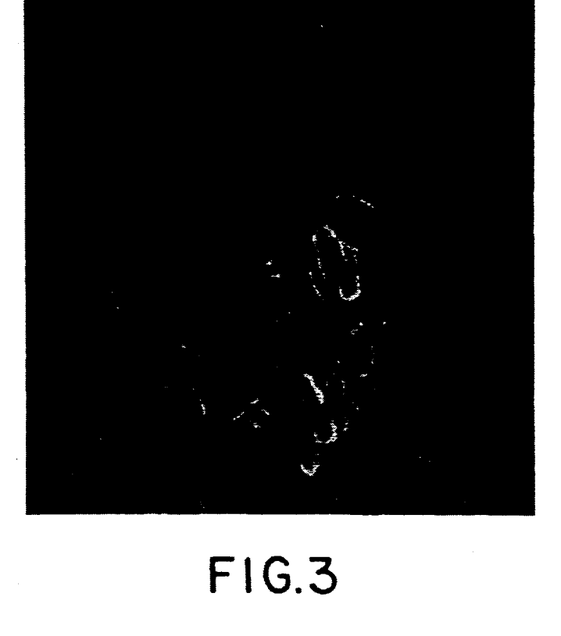
Figure 4:
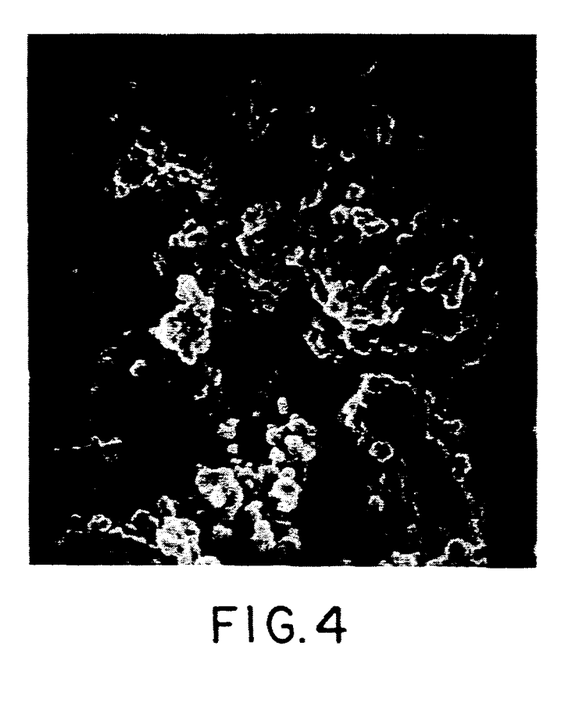
FIGS. 4 through 7 are electron photomicrographs of PCC produced without sugar.
Figure 5:
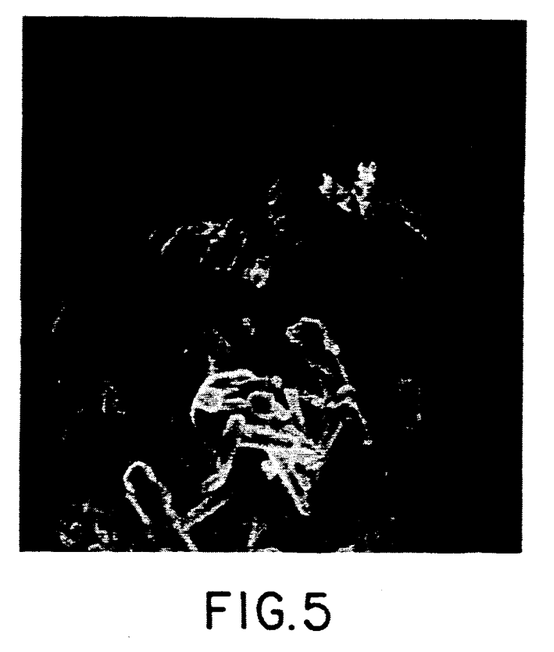
Figure 6:
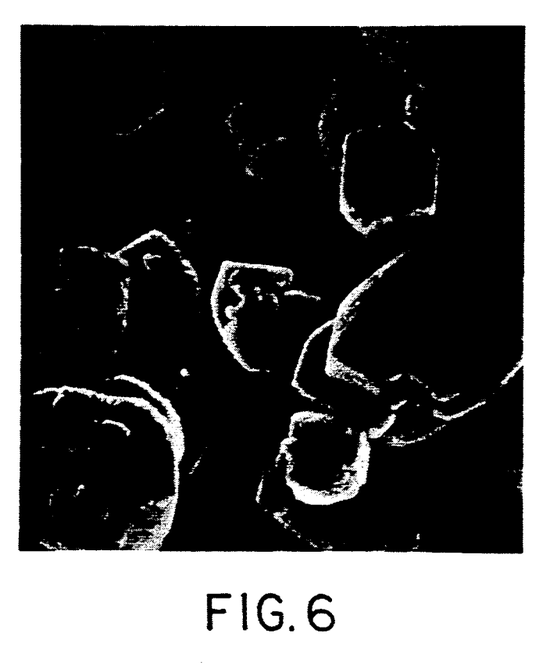
Figure 7:
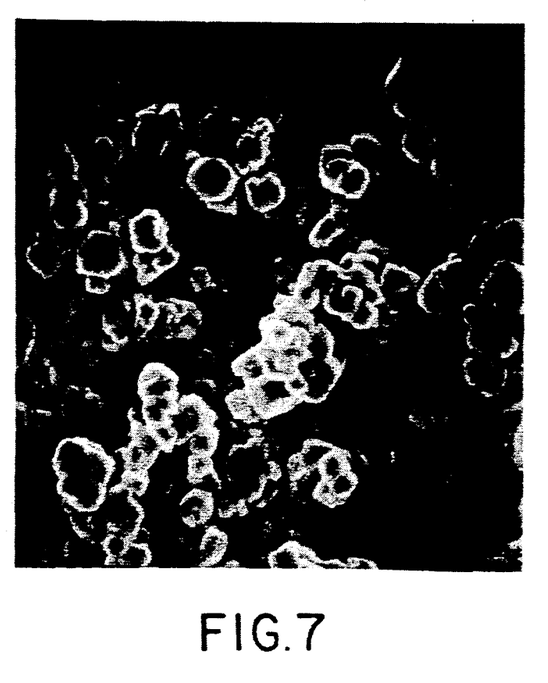

The results of this process, along with several others carried out at various sugar dosages and starting carbonation temperatures, are given in Table 1 set forth below. Typical scanning electron micrographs of the PCC produced are shown in FIGS. 1 through 3. Data is plotted in FIG. 8, which corresponds to the 0.25% sugar dosage data in Table 1.

TABLE 1

Rhombic PCC - Processes with varied sugar concentrations. Initial slaking temp. 100° F., no control of maximum slaking temperature. Solids concentration = 180–210 g/l

| Lime Type | Sugar Dosage % | Carb. Temp. Deg. F. | PCC-Surface Area (Blaine $cm^2/g$) | PCC BET $m^2/g$ |
|---|---|---|---|---|
| G | 0.25 | 52 | 21200 | 5.7 |
| | 0.25 | 55 | 21700 | 5.3 |
| | 0.25 | 55 | 23400 | 5.8 |
| | 0.25 | 60 | 25409 | 6.2 |
| | 0.25 | 65 | 32000 | 8 |
| | 0.15 | 55 | 19300 | 4.8 |
| | 0.15 | 60 | 26750 | 6.4 |
| | 0.1 | 55 | 33800 | 12 |
| | 0.1 | 60 | 41400 | 12 |

The present process may be usefully compared to that in the previously mentioned Waldeck, U.S. Pat. No. 3,320,026. In the present invention higher slaking temperature without any control of maximum slaking temperature was used, which results in less than 5% refuse and better yield. Also higher hydroxide concentration was employed, which increases the plant throughput and does not need further product concentration. In addition, the maximum carbonation temperature was not controlled.

In spite of not employing these previously claimed techniques (low concentration, low slaking temperature, control of maximum slaking/carbonation temperature, etc. which increase the production costs), very reproducible rhombic PCC production was achieved, with excellent control on PCC surface area as a function of carbonation temperature. Thus, PCC can now be produced under more economical conditions than previously disclosed. Also, the consistency of PCC surface area is vastly improved resulting in a better quality product as no blending of different surface area batches is needed. Neither is there a need to discard batches that are out of specification due to inconsistent PCC production.

EXAMPLE 2

The same procedure described in Example 1 was repeated except for the sugar solution and for the fact that lower slaking and carbonation temperatures were used. Maximum slaking and carbonation temperatures were maintained at 90° F. and lower hydroxide concentrations were used. All these conditions were employed, as taught by Waldeck et al., U.S. Pat. No. 3,320,026. Sugar was not included in the process. The results obtained at various starting carbonation temperatures (without sugar) are presented in Table 2. It is seen that a large number of batches were very high surface area, aggregated PCC. Typical scanning electron micrographs of the PCC produced without sugar are given in FIGS. 4 through 7. The results in Examples 1 and 2 are compared in FIG. 8.

TABLE 2

Rhombic PCC - Produced Without Sugar
Initial slaking temp. 60° F.
maximum slaking temperature 90° F.
Slurry concentration = 130–150 g/l.

| Lime Type | Sugar Dosage % | Carb. Temp. Deg. F. | PCC-Surface Area (Blaine cm²/g) | PCC BET m²/g |
|---|---|---|---|---|
| G | — | 54 | 19400 | 5.04 |
|   | — | 55 | 12900 | 3.3 |
|   | — | 55 | 13100 | 2.9 |
|   | — | 55 | 52800* | 25.1 |
|   | — | 55 | 61800* | 24.3 |
|   | — | 56 | 12900 | 3.4 |
|   | — | 56 | 13300 | 2.8 |
|   | — | 56 | 14150 | 6.8 |
|   | — | 57 | 13600 | 2.9 |
|   | — | 58 | 14900 | 2.6 |
|   | — | 58 | 14000 | 3.5 |
|   | — | 58 | 20500 | 4.1 |
|   | — | 58 | 27100 | 7.2 |
|   | — | 58 | 34600 | 10 |
|   | — | 58 | 39800 | 16.9 |
|   | — | 58 | 46000 | 16.4 |
|   | — | 58 | 61300* | 30.3 |
|   | — | 60 | 57500 | 29.1 |
|   | — | 63 | 54360 | 26.5 |

*Initial slaking temp. = 100° F.
Solids concentration = 180–210 g/l.

As seen in Table 2, in spite of using lower concentration, lower slaking temperatures and controlling the maximum slaking temperatures to 90° F., the surface area response of PCC was unpredictable. Very high surface area aggregated PCC was predominantly produced when rhombic PCC having surface area larger than 5 m²/g was attempted (there were a few exceptions, but consistency was lacking).

This indicates two limitations of the prior art (e.g. Waldeck U.S. Pat. No. 3,320,026): Not only are conditions of use taught that are uneconomical in a plant operation; but even after employing those conditions, the desired PCC surface area consistency is not achieved.

EXAMPLE 3

The experiments without sugar (as in Example 2) were carried out for lime samples M (source) having reactivity greater than 30° C. As seen from Table 3, very high surface area aggregated PCC was produced when sugar was not used in the slaker and the temperature was not controlled. The addition of sugar in the carbonator (instead of in the slaker), also produced very high surface area aggregated PCC, contrary to the disclosures in some patents (e.g. McClure et al., U.S. Pat. No. 2,188,663; Fleck, No. 2,467,082; Sisson et al., No. 3,433,890).

Table 3 also shows that for this lime, maximum temperature control during slaking and carbonation, and lower starting slaking temperature was useful in producing low surface area PCC, as taught by the patent of Waldeck (U.S. Pat. No. 3,320,026). However, a high surface area PCC, in the 5 to 10 m²/g BET surface area range could not consistently be made by this technique. See experiment at 63° F. carbonation temperature. Also, the lower slaking temperature and the temperature of maximum slaking and carbonation temperatures represents higher cooling costs and lower yield.

TABLE 3

Rhombic PCC Produced from Lime M
No additive in Slaker
Solids Concentration 188 to 202 g/l

| Slaking Temp. Deg. F. | Carb. Temp. Deg. F. | Carb. Additive % | PCC BET m²/g |
|---|---|---|---|
| 100 | 60 | — | 20.4 |
| 100 | 60 | 0.1 S | 45.5 |
| 100 | 60 | 0.1 S | 37.8 |
| 60–90 max | 60–90 max | — | 3.7 |
| 60–90 max | 63–90 max | — | 24.3 |

EXAMPLE 4

When sugar was employed in the slaker, PCC with desired surface area was consistently produced and very high surface area, aggregated PCC was not produced for lime M. In this case the preferred sugar dosage was observed to be in the range of 0.1 to 0.25%. See Table 4. The effect of higher slaking temperature is also seen in this Table.

TABLE 4

Rhombic PCC Produced from Lime M
Effect of sugar as a slaking additive
Solids Concentration 189–202 g/l

| Sugar Dosage % | Slaking Temp. Deg. F. | Carb. Temp. Deg. F. | PCC Bet m²/g |
|---|---|---|---|
| 0.1 | 100 | 60 | 5.9 |
| 0.1 | 100 | 60 | 6.7 |
| 0.1 | 100 | 60 | 8.1 |
| 0.1 | 120 | 60 | 12 |
| 0.1 | 130 | 60 | 15.6 |

EXAMPLE 5

The results with no sugar addition in the slaker at various starting temperatures, with and without maximum temperature control are depicted in Table 5, for lime A. For this lime, the lower starting temperatures, maximum temperature control and no sugar addition were all ineffective in preventing the production of very high surface area aggregated PCC.

TABLE 5

Rhombic PCC Produced from Lime A
Effect of temperature and its control on
PCC product quality, no additives
Solids Concentration 192–201 g/l

| Sugar Dosage % | Slaking Temp. Deg. F. | Carb. Temp. Deg. F. | PCC BET m²/g |
|---|---|---|---|
| — | 100 | 60 | 33.7 |
| — | 130 | 60 | 33.3 |
| — | 60–90 max | 60–90 max | 37.8 |
| — | 60–90 max | 60–90 max | 27.6 |
| — | 60–90 max | 60–90 max | 32.9 |
| — | 60–90 max | 63–90 max | 36 |

EXAMPLE 6

However, when sugar in the dose range of 0.1 to 0.3% was employed in the slaker, the production of very high surface area, aggregated PCC was prevented. See Table 6.

TABLE 6

Rhombic PCC Produced from Lime A
Effect of sugar as a slaking additive
Solids Concentration 181-200 g/l

| Sugar Dosage % | Slaking Temp. Deg. F. | Carb. Temp. Deg. F. | PCC BET $m^2/g$ |
|---|---|---|---|
| 0.05 | 100 | 60 | 34.3 |
| 0.1 | 100 | 60 | 8.9 |
| 0.2 | 100 | 60 | 8.5 |
| 0.2 | 100 | 60 | 10.8 |

EXAMPLE 7

Figure 8:
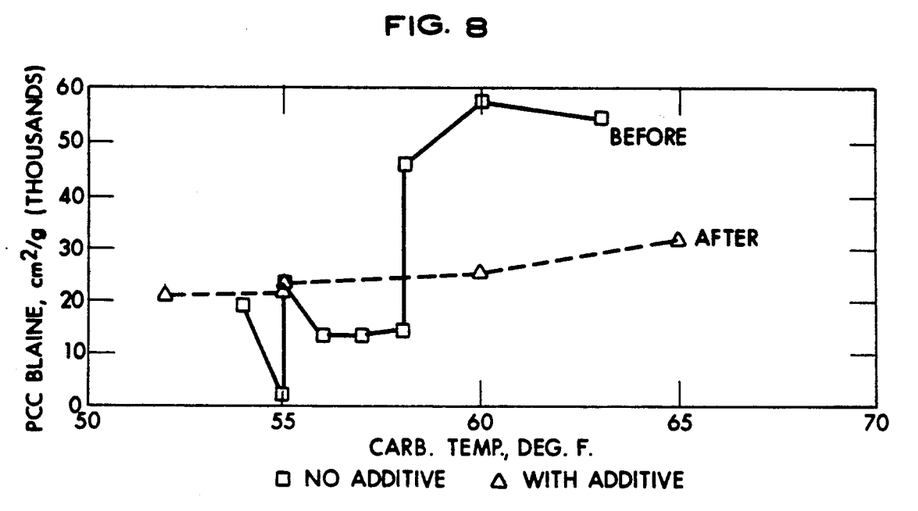
FIG. 8 is a graphic representation of the surface area of PCC produced at a temperature of about 50° F.-70° F. initial carbonating temperature without sucrose in solution (Before) and with sucrose in solution (0.25%) (After)
Figure 9:
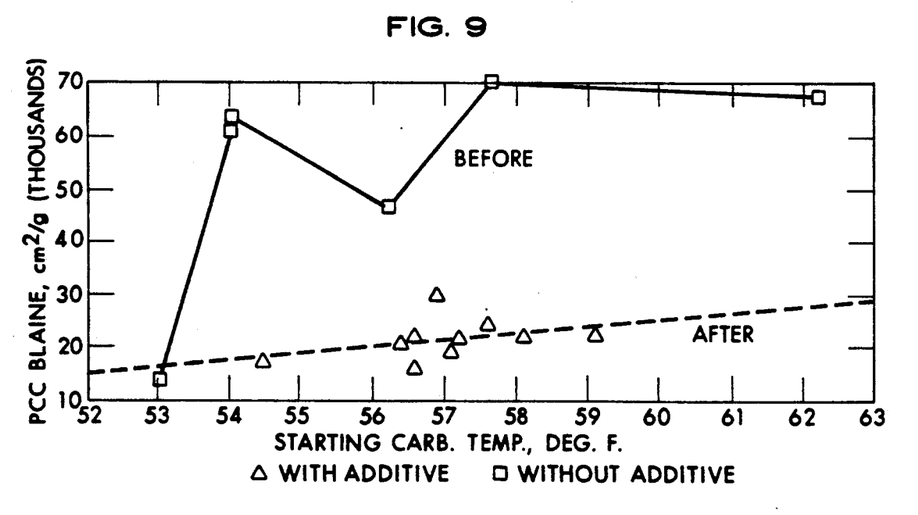
FIG. 9 is a graphic representation of the surface area of PCC produced in a pilot plant utilizing an initial carbonating temperature of about 50° F.-70° F. without sucrose in solution (Before) and with sucrose in solution (0.15%) (After).

The addition of sugar and its stabilizing effect on the PCC production is apparent from the graph shown in FIG. 8. The procedure of Example 1 was repeated on a pilot plant scale. A continuous slaker was used for the production of $Ca(OH)_2$ from CaO. The results of rhombic PCC production at the pilot plant scale without sugar addition are presented in Table 7, and the results with sugar used are given in Table 8. Once again the effect of sugar addition on the rhombic PCC product consistency is clear. The pilot plant results, with and without sugar, are compared in FIG. 9.

TABLE 7

Rhombic PCC, Pilot Plant Scale - No Sugar Used

| Lime Type | Sugar Dosage % | Carb. Temp. Deg. F. | PCC-Surface Area (Blaine $cm^2/g$) |
|---|---|---|---|
| G | — | 53 | 13800 |
|   | — | 54 | 61100 |
|   | — | 54 | 63700 |
|   | — | 56.2 | 47000 |
|   | — | 57.6 | 70000 |

TABLE 8

Rhombic PCC, Pilot Plant Scale - Sugar Used

| Lime Type | Sugar Dosage % | Carb. Temp. Deg. F. | PCC-Surface Area (Blaine $cm^2/g$) |
|---|---|---|---|
| G | 0.15 | 54.5 | 17000 |
|   | 0.15 | 56.4 | 20500 |
|   | 0.15 | 56.6 | 16000 |
|   | 0.15 | 56.6 | 22100 |
|   | 0.15 | 56.9 | 30000 |
|   | 0.15 | 57.1 | 19000 |
|   | 0.15 | 57.2 | 21600 |
|   | 0.15 | 57.6 | 24000 |

From the processes described above and from the data generated, it is clear that controlled dosages of a sugar solution provide consistent production of rhombic PCC.

The advantages of this improved process include:

1. Higher slaking temperatures, resulting in lower residue, and residue disposal costs, higher PCC yield and lower cooling costs.

2. No need to control maximum slaking and carbonation temperatures, resulting in lower cooling costs.

3. Higher hydroxide concentrations can be used, resulting in higher PCC production per batch.

4. Most importantly, better PCC surface area consistency, resulting in better product quality, and fewer out-of-specification batches to be wastefully discarded.

It will be apparent to those skilled in the art that numerous alternative processes for producing rhombic PCC can be practiced without deviating from the spirit of the invention. Consequently, the scope of the claims is not to be limited to the specific teachings herein.

What is claimed is:

1. An improved process for producing rhombic shaped precipitated calcium carbonate comprising:
    (a) slaking quicklime to form slaked lime in an aqueous solution containing about 0.01% to about 2% by weight of sugar, based on the weight of the calcium carbonate to be produced, to form a slaked lime slurry; and
    (b) adding carbon dioxide to the slaked lime slurry at an initial temperature in the range of about 40° F.–80° F. until the pH drops from about 11-12 to about 7-8 to precipitate the rhombic shaped calcium carbonate having a surface area of 2-20 $m^2/g$.

2. A process in accordance with claim 2, wherein the said initial temperature at which said carbon dioxide is added is in the range of 50° F. to 70° F.

3. A process in accordance with claim 2, wherein said sugar is a mono or disaccharide.

4. A method in accordance with claim 3, wherein the concentration of said sugar in said solution is from 0.1 to 0.3% by weight.

5. A process in accordance with claim 4, wherein said sugar is sucrose.

6. A process in accordance with claim 5, wherein said quicklime is added to a warm solution of said sucrose.

7. A process in accordance with claim 6, wherein the starting temperature for carbonation is in the range of 50° F. to 65° F.

8. A process in accordance with claim 7, wherein the starting temperature for slaking is in the range of from about 60° F. to 130° F.

9. A process in accordance with claim 2, wherein the carbon dioxide which is added to the slaked lime is premixed with an inert gas or air in a relative ratio of about 1:0 to 1:20.

10. A process in accordance with claim 9, wherein said premixing is with air.

11. A method in accordance with claim 2, where step (a) is conducted with continuous mixing.

12. A method in accordance with claim 2, wherein the slaking is conducted as a batch process.

13. A method in accordance with claim 2, wherein the slaking is conducted in a continuous slaker to which said solution containing said sugar is pumped continuously.

14. A method in accordance with claim 2, wherein constant stirring is applied throughout the carbonation reaction of step (b).

* * * * *